US012650496B2

(12) United States Patent
Lu et al.

(10) Patent No.: US 12,650,496 B2
(45) Date of Patent: Jun. 9, 2026

(54) LIGHT CONCENTRATING DEVICE FOR OPTICAL SENSING SYSTEMS

(71) Applicant: BEIJING VOYAGER TECHNOLOGY CO., LTD., Beijing (CN)

(72) Inventors: Yue Lu, Mountain View, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1151 days.

(21) Appl. No.: 17/470,602

(22) Filed: Sep. 9, 2021

(65) Prior Publication Data

US 2023/0073107 A1     Mar. 9, 2023

(51) Int. Cl.
| | |
|---|---|
| *G01S 7/481* | (2006.01) |
| *G01S 17/89* | (2020.01) |
| *G01S 17/931* | (2020.01) |
| *G02B 19/00* | (2006.01) |

(52) U.S. Cl.
CPC ............ *G01S 7/4816* (2013.01); *G01S 17/89* (2013.01); *G01S 17/931* (2020.01); *G02B 19/0004* (2013.01)

(58) Field of Classification Search
CPC ............ G02B 19/0004; G02B 19/0019; H10F 77/488; Y02E 10/52
See application file for complete search history.

(56) References Cited

U.S. PATENT DOCUMENTS

| | | | | |
|---|---|---|---|---|
| 2011/0228142 A1* | 9/2011 | Brueckner | ........... | H04N 23/951 |
| | | | | 348/E5.079 |
| 2017/0352771 A1* | 12/2017 | Gu | ........................ | H10F 77/484 |
| 2020/0036918 A1* | 1/2020 | Ingle | ................... | H10F 39/8053 |
| 2023/0047601 A1* | 2/2023 | Wang | ........................ | G01J 5/12 |

* cited by examiner

*Primary Examiner* — Thanh Luu
(74) *Attorney, Agent, or Firm* — BAYES PLLC

(57) ABSTRACT

Embodiments of the disclosure provide an optical sensing device for a receiver in an optical sensing system. The optical sensing device includes a light concentrator configured to collect a light beam. The light concentrator includes an input aperture configured to collect the light beam, an output aperture configured to output the light beam, and a side surface in contact with the input aperture and the output aperture. The side surface is configured to reflect the collected light beam towards the output aperture. The optical sensing device also includes a photodetector placed behind the light concentrator. The photodetector is configured to receive the light beam collected through the output aperture and convert the light beam to an electrical current.

17 Claims, 6 Drawing Sheets

306

316

314

LIGHT CONCENTRATING DEVICE FOR OPTICAL SENSING SYSTEMS

TECHNICAL FIELD

The present disclosure relates to a light concentrating device, and more particularly to, light concentrators used in a receiver for light detection and ranging (LiDAR).

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The receiver of a LiDAR system includes a photosensor that converts received light to electrical signals. For sensing applications, a single photon avalanche diode (SPAD) array is often used as the photosensor for sub-pixelization to enhance the overall resolution of the LiDAR system. However, due to factors such as relatively low fill factor of the photo-sensitive area versus the SPAD chip area, the detection efficiency of SPAD array is often undesirably low, impeding larger scale applications of the SPAD array in the LiDAR system.

Embodiments of the disclosure address the above problems by utilizing a light concentrating device in a receiver for LiDAR.

SUMMARY

Embodiments of the disclosure provide an optical sensing device for a receiver in an optical sensing system. The optical sensing device includes a light concentrator configured to collect a light beam. The light concentrator includes an input aperture configured to collect the light beam, an output aperture configured to output the light beam, and a side surface in contact with the input aperture and the output aperture. The side surface is configured to reflect the collected light beam towards the output aperture. The light concentrator also includes a photodetector placed behind the light concentrator. The photodetector is configured to receive the light beam collected through the output aperture and convert the light beam to an electrical current.

Embodiments of the disclosure also provide an optical sensing device for a receiver in an optical sensing system. The optical sensing system includes an array of light concentrators configured to collect a light beam for an array of photodetectors. Each of the light concentrators is over a respective photodetector. Each light concentrator includes an input aperture configured to collect the light beam, a side surface surrounding the input aperture, configured to reflect the light beam towards an output aperture, and an output aperture configured to output the light beam. The optical sensing system also includes an array of photodetectors placed behind the light concentrators. The photodetectors are each configured to receive the light beam collected through the output aperture and convert the light beam to an electrical current.

Embodiments of the disclosure also provides an optical sensing system. The optical sensing system includes a transmitter configured to transmit a light beam towards an object and a receiver configured to receive the light beam returned from the object and convert the laser beam to an electric current. The receiver includes an array of light concentrators configured to collect a light beam for an array of photodetectors. Each of the light concentrators is over a respective photodetector. Each light concentrator includes an input aperture configured to collect the light beam, a side surface surrounding the input aperture, configured to reflect the light beam towards an output aperture, and an output aperture configured to output the light beam. The optical sensing system also includes an array of photodetectors placed behind the light concentrators. The photodetectors are each configured to receive the light beam collected through the output aperture.

It is to be understood that both the foregoing general description and the following detailed description are exemplary and explanatory only and are not restrictive of the invention, as claimed.

DETAILED DESCRIPTION

Figure 1:
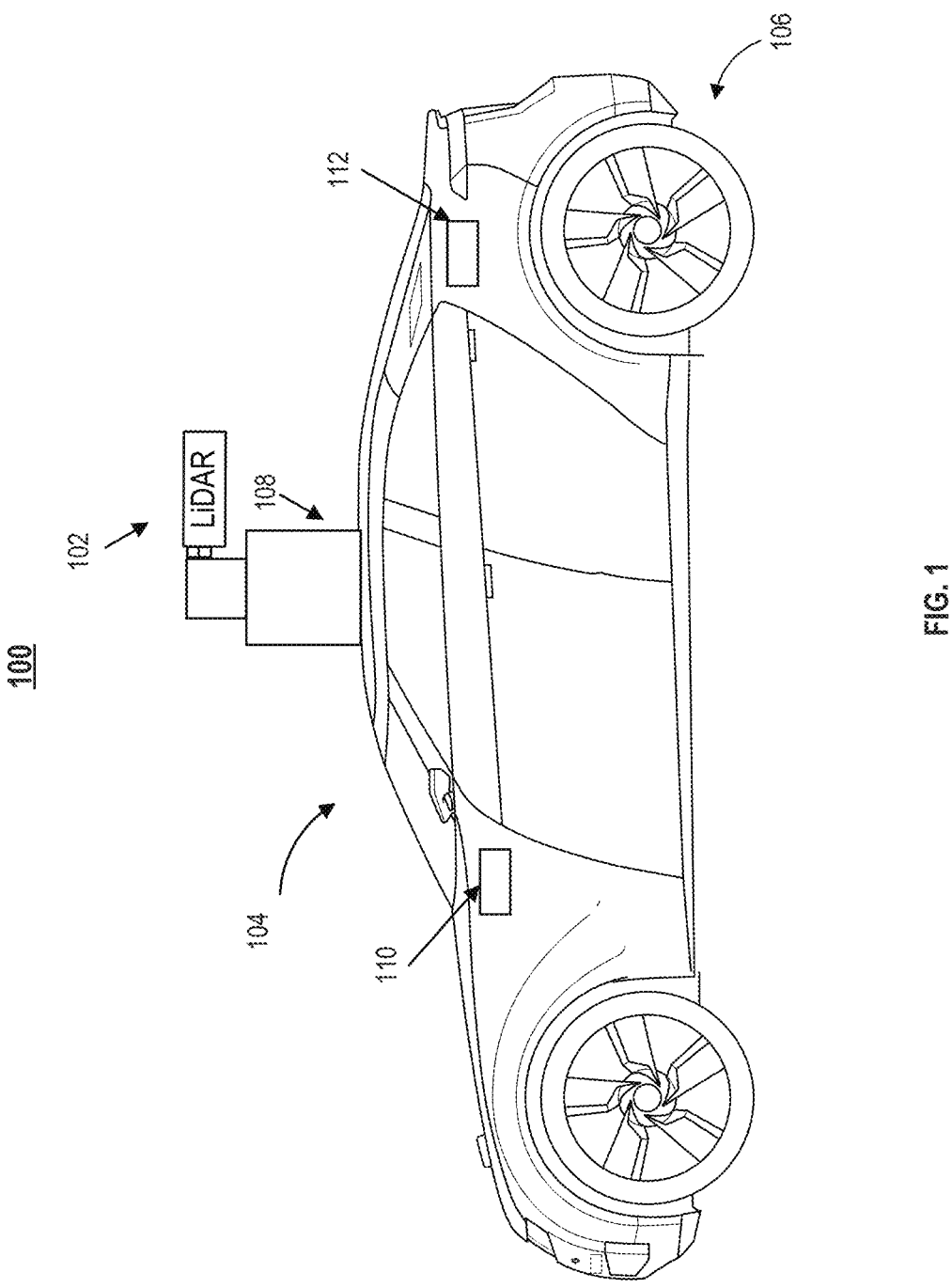
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

SPAD array is widely used in different LiDAR applications. A SPAD is a solid-state photodetector that utilizes a phenomenon referred to as impact ionization under a high reverse bias. A SPAD has a photo-sensitive area for receiving light, i.e., photons, and converting the received light to an electrical signal. When photons are absorbed in the photo-sensitive area, photo-generated carriers, i.e., holes or electrons, are accelerated by the electric field in the SPAD, and a large avalanche of these carriers grows exponentially. The avalanche phenomenon can be triggered from as few as a single photon-generated carrier. SPADs or SPAD arrays can thus be used in light sensing applications that require high sensitivity. For example, a LiDAR can use a SPAD array for direct time of flight (TOF) distance measurement. A LiDAR system can also use SPAD for sub-pixelization to enhance the overall resolution of the LiDAR system. As mentioned earlier, one technical challenge impeding SPAD array from applications of greater scale is the low detection efficiency of SPADs. Often, the low efficiency is related to the relatively low fill factor of the SPAD array. The fill factor can be defined as a ratio of the photo-sensitive area of the SPAD array versus the overall SPAD chip area. To overcome this issue, efforts have been put into the micro lens array (MLA) development to concentrate light incident on the photo-sensitive area. However, the concentration of light by MLA depends on the incident angle of the light. When the incident angle is large, light cannot be collected easily onto the photo-sensitive area.

The present disclosure provides a light concentrating device that can improve the collection efficiency of light onto the photo-sensitive area of a photosensor, compared to a MLA. The light concentrating device may be employed in the receiver of a LiDAR system to concentrate incident light beam before it reaches the photosensor. A higher detection efficiency can be obtained by the photosensor, e.g., a SPAD chip. The light concentrating device can have a gain number greater than 1 to increase the amount of light incident on the photo-sensitive area of the photosensor. Loss of light caused by light incident on non-photo-sensitive area of the photosensor can be minimized or eliminated. The light concentrating device can be fabricated in a wafer-level process and has an architecture compatible with the photosensor. The light concentrating device can then be integrated with the photosensor in fabrication.

In an example, the photosensor includes a SPAD array and the light concentrating device includes an array of light concentrators positioned between the incident light and the SPAD array. Each light concentrator is coupled to a respective SPAD, configured to collect/concentrate the light to be incident on the SPAD. Each light concentrator can have an input aperture for receiving light, a side surface for reflecting the received light, and an output aperture for outputting reflected light towards the respective SPAD. The respective values of the input aperture and the depth, and the profile of the side surface of each light concentrator are optimized to accept light from a desirably wide range of angles. An area of the input aperture is greater than an area of the output aperture, allowing the gain number to be greater than 1. Adjacent light concentrators are connected with or in contact with each other to cover the non-photo-sensitive area between adjacent SPADs, maximizing the amount of light collected by the light concentrators. An acute angle between the side surface and the bottom surface of each light concentrator ranges from about 45° to about 75°.

The side surface of the light concentrator includes a material that can be patterned using wafer-level fabrication. The material is coated with a reflective layer for reflecting any collected light. In an example, the side surface includes single-crystalline silicon coated with a metal layer. An acute angle between the side surface and the bottom surface of the light concentrator is equal to the angle between the <111> plane of the single-crystalline silicon and the bottom surface of the light concentrators.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser beam and measuring the reflected pulses with a receiver. The laser beam used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

Figure 2:
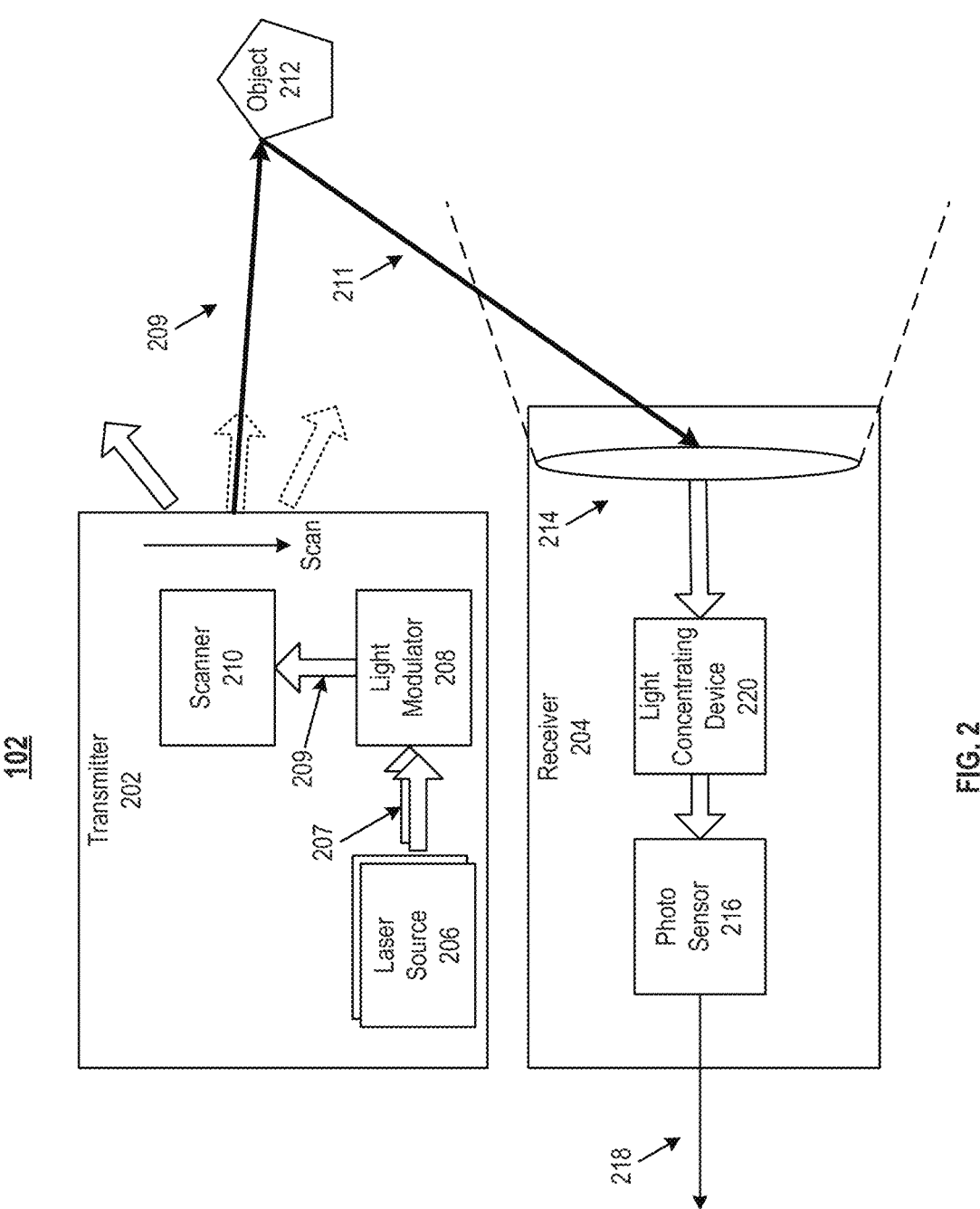
FIG. 2 illustrates a block diagram of an exemplary LiDAR system having a receiver with a light concentrating device, according to embodiments of the disclosure.

FIG. 2 illustrates a block diagram of an exemplary LiDAR system 102 having a receiver 204 with a light concentrating device 220, according to embodiments of the disclosure. Receiver 204 may also include a lens 214 and a photosensor 216. LiDAR system 102 may also include a transmitter 202. Transmitter 202 may include one or more laser sources 206 and a scanner 210, and may emit laser beams within a scan angle. Receiver 204 may receive the reflected laser beam and convert the reflected laser beam into electricity. As described below in detail, light concentrating device 220 may collect/concentrate the reflected laser beam before it is received by photosensor 216 such that a large portion of the reflected light can be incident on the photo-sensitive area of photosensor 216.

As part of LiDAR system 102, transmitter 202 can sequentially emit a stream of pulsed laser beams in different directions within its scan angle, as illustrated in FIG. 2. Laser source 206 may be configured to provide a laser beam 207 (referred to herein as "native laser beam") in a respective incident direction to scanner 210. In some embodiments of the present disclosure, laser source 206 may generate a pulsed laser beam in the ultraviolet, visible, or near infrared wavelength range.

In some embodiments of the present disclosure, laser source 206 is a pulsed laser diode (PLD). A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm.

Scanner 210 may be configured to emit a laser beam 209 to an object 212 in a first direction. Object 212 may be made of a wide range of materials including, for example, non-metallic objects, rocks, rain, chemical compounds, aerosols, clouds and even single molecules. The wavelength of laser beam 209 emitted may vary based on the composition of object 212. At each time point during the scan, scanner 210 may emit laser beam 209 to object 212 in a direction within the scan angle. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include lens 214, light concentrating device 220, and photosensor 216. Lens 214 be configured to collect light from a respective direction in its field of view (FOV). At each time point during the scan, returned laser beam 211 may be collected by lens 214. Returned laser beam 211 may be returned from object 212 and have the same wavelength as laser beam 209.

Light concentrating device 220 may be positioned between lens 214 and photosensor 216 for concentrating light from lens 214 onto the photo-sensitive area of photosensor 216. In some embodiments, photosensor 216 is placed behind light concentrating device 220. Depending on the architecture of photosensor 216, light concentrating device 220 can have an architecture that can be integrated with photosensor 216 through a suitable coupling, such as bonding. In some embodiments, photosensor 216 includes a single photodetector, e.g., a single SPAD, and light concentrating device 220 includes a single light concentrator. In some embodiments, photosensor 216 includes an array of photodetectors, e.g., a SPAD array, and light concentrating device 220 includes an array of light concentrators. Details of light concentrating device 220 are illustrated as follows.

Photosensor 216 may be configured to detect returned laser beam 211 returned from object 212. Photosensor 216 may convert the laser light (e.g., returned laser beam 211) collected by lens 214 and light concentrating device 220 into an electrical signal 218 (e.g., a current or a voltage signal). The current is generated when photons are absorbed in the photo-sensitive area of photosensor 216. In some embodiments of the present disclosure, photosensor 216 may include an avalanche photodiode (APD) such as a single SPAD or a SPAD array. In other various embodiments, photosensor 216 can also include a silicon photo multiplier (SiPM) or other suitable photodetectors. The specific types of photodetectors in photosensor 216 are not limited by the embodiments of the present disclosure.

Figure 3A:
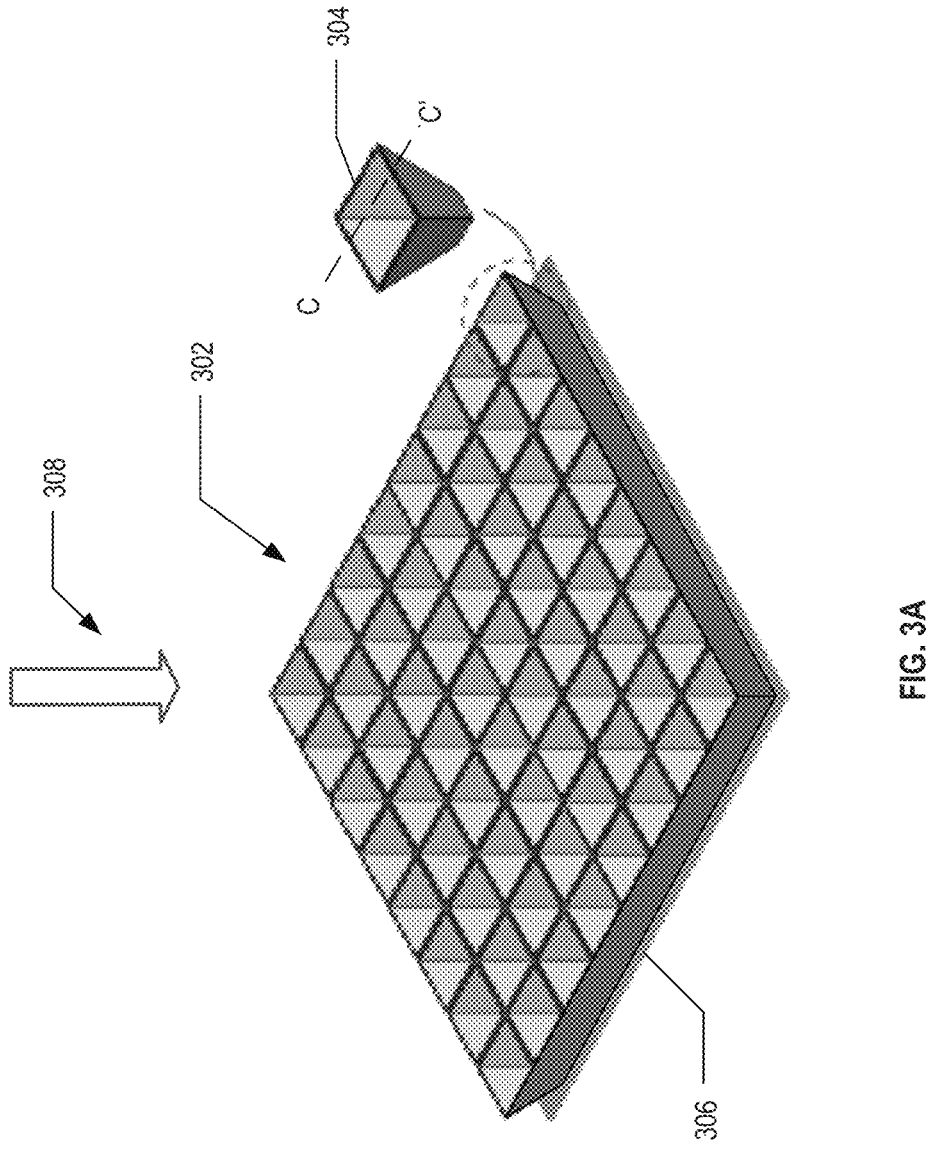
FIG. 3A illustrates a light concentrating device coupled with a SPAD array, according to embodiments of the disclosure.
Figure 3A:
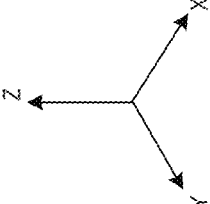
Figure 3B:
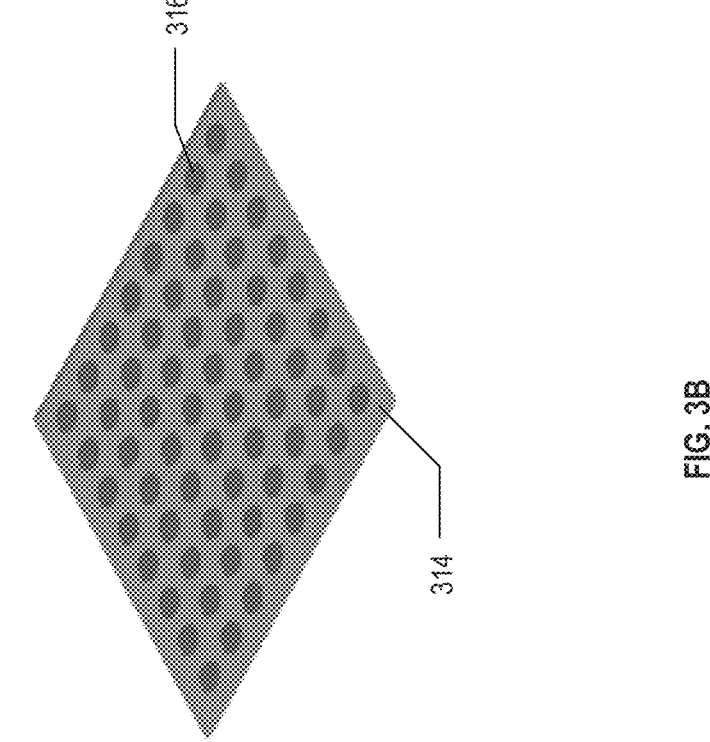
FIG. 3B illustrates a SPAD array, according to embodiments of the disclosure.
Figure 3B:
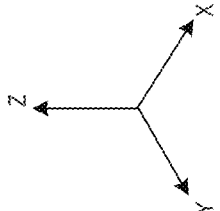

FIG. 3A illustrates a light concentrating device 302 integrated with a SPAD array 306, according to some embodiments. Light concentrating device 302 may be an example of light concentrating device 220. SPAD array 306 may be an example of photosensor 216. FIG. 3B illustrates SPAD array 306, according to some embodiments. For ease of illustration, FIGS. 3A and 3B are described together. As shown in FIG. 3A, light concentrating device 302 may be integrated with SPAD array 306 for collecting a light beam 308. In some embodiments, light concentrating device 302 is bonded to SPAD array 306 through eutectic bonding and/or anodic bonding. Light beam 308 may be an example of returned laser beam 211 passing through lens 214 and to be incident on light concentrating device 302. In some embodiments, SPAD array 306 is positioned behind light concentrating device 302 such that light beam 308 can be collected by light concentrating device 302 before reaching SPAD array 306.

FIG. 3B illustrates SPAD array 306 having a plurality of SPADs 316 arranged in a SPAD chip 314. SPADs 316 may be formed on a substrate (not shown) in SPAD chip 314. In some embodiments, SPADs 316 are arranged in an array of rows and columns. Each SPAD 316, functioning as a sub-pixel of SPAD array 306, may include a photo-sensitive area for receiving light, e.g., photons, and converting the photons to electrical signals. The photo-sensitive area may have a suitable shape such as a circular shape or a square shape. As an example, the photo-sensitive area is depicted to have a circular shape in this disclosure. The photo-sensitive area may include a photo-sensitive semiconductor material, e.g., III-V compounds such as gallium arsenide (GaAs) and/or indium gallium arsenide (InGaAs), single-crystalline silicon, and so on, for light absorption and conversion. The rest of the area on SPAD chip 314 may not include photo-sensitive materials and may be referred to as a non-photo-sensitive area. The fill factor of SPAD array 306 may be defined as the ratio of the total photo-sensitive area of all SPADs 316 to the total surface area of SPAD chip 314.

Referring back to FIG. 3A, light concentrating device 302 may include a plurality of light concentrators 304, arranged in an array of rows and columns. Each light concentrator 304 may be over and covering a respective SPAD 316 such that light can be collected/concentrated before incident on the respective SPAD 316. Light concentrator 304 may be configured to collect light beam 308 of a wider range of angles than SPAD 316 alone, thus increasing the light collection efficiency. The light absorption of the respective SPAD 316 can be increased and, accordingly, the detection efficiency of SPAD 316 can be increased. Each light concentrator 304 may include an input aperture and an output aperture. The respective SPAD 316 may be positioned under/behind the output aperture. The input aperture may be facing and receiving light beam 308, and the output aperture may output the collected light to the respective SPAD 316. In some embodiments, adjacent light concentrators 304 may be in contact with each other to maximize the light collected by light concentrators 304, and thus minimize the light incident on non-photo-sensitive area of SPAD chip 314. As an example, light concentrator 304 may have an inverse pyramidal shape in which the area of the input aperture is greater than the area of the output aperture.

Figures 4A, 4B:
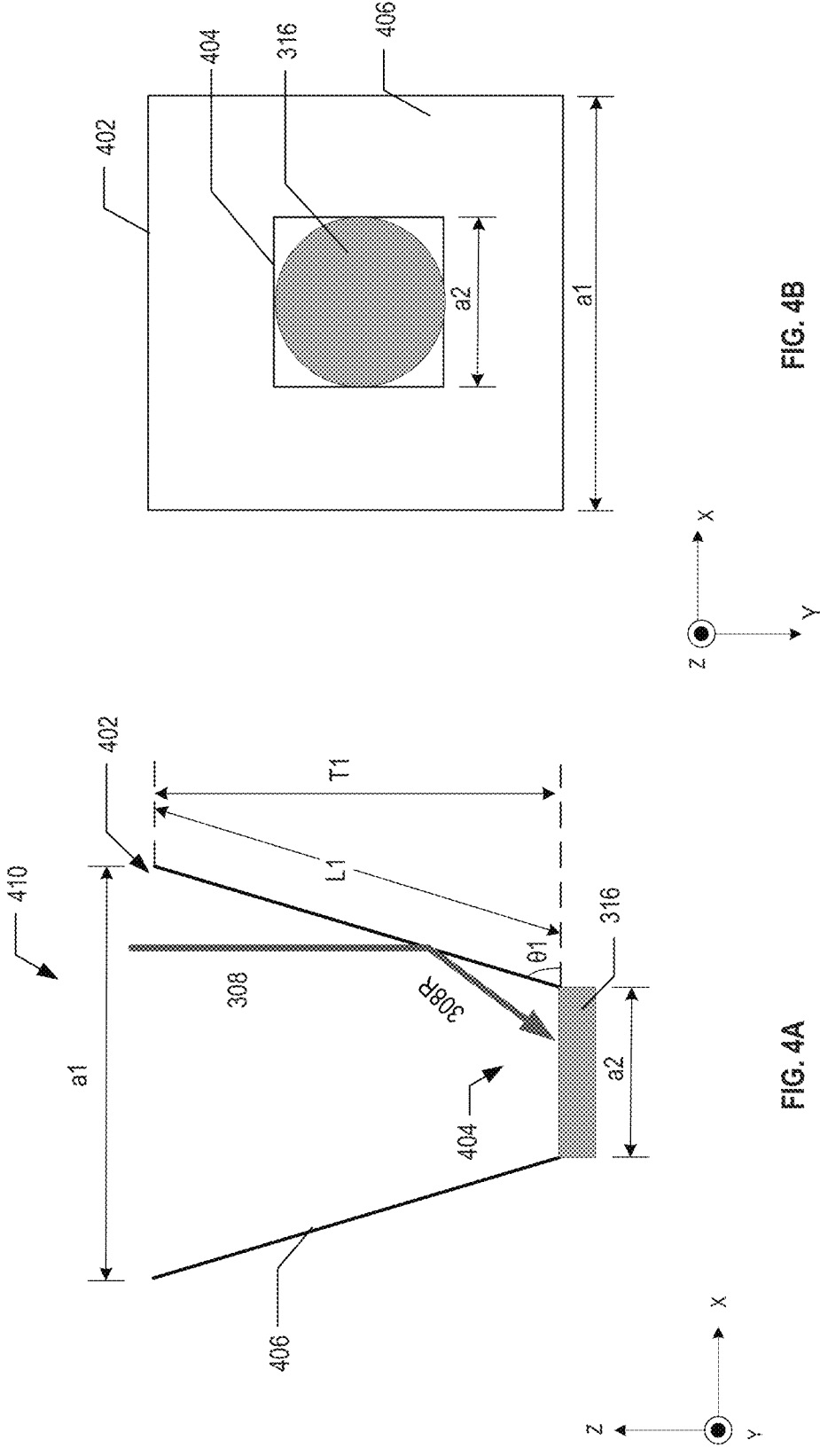
FIG. 4A illustrates a cross-sectional view of an exemplary light concentrator, according to embodiments of the disclosure.
FIG. 4B illustrates a top view of the light concentrator shown in FIG. 4A, according to embodiments of the disclosure.

FIG. 4A illustrates a cross-sectional view of a light concentrator 410 and respective SPAD 316 along a C-C' direction, according to some embodiments. FIG. 4B illustrates an overview of light concentrator 410 and respective SPAD 316, according to some embodiments. Light concentrator 410 may be an example of light concentrator 304 shown in FIG. 3A. For ease of illustration, FIGS. 4A and 4B are described together. As shown in FIGS. 4A and 4B, light concentrator 410 may include an input aperture 402, an output aperture 404, and a side surface 406 in contact with input aperture 402 and output aperture 404. Light concentrator 410 may also be referred to as a V-trough light concentrator. Light beam 308 may pass through input aperture 402, be incident on side surface 406, and be reflected towards output aperture 404. SPAD 316 may be positioned behind output aperture 404 to receive a reflected light beam 308R. For ease of illustration, a top surface of SPAD 316 is described as being parallel with the x-y plane (e.g., a horizontal plane), and the direction perpendicular to the x-y plane is described as the z-direction (e.g., a vertical direction).

Input aperture 402 of light concentrator 410 may be located at a top surface of light concentrator 410. In some embodiments, the top surface is in parallel with the x-y plane. Output aperture 404 of light concentrator 410 may be located at a bottom surface of light concentrator 410. In some embodiments, the bottom surface is in parallel with the x-y plane. As shown in FIG. 4A, along the z-direction, input aperture 402 is above output aperture 404 such that input aperture 402 is further away from SPAD 316 than output aperture 404. Input aperture 402 may be configured to receive light beam 308, and output aperture 404 may be configured to output reflected light beam 308R. Input aperture 402 and output aperture 404 may each have a suitable shape such as a square shape, a circular shape, a rectangular shape, etc. In some embodiments, input aperture 402 has a square shape such that sides of adjacent light concentrator 410 can be fully in contact with each other, minimizing the amount of light incident on the non-photo-sensitive area of SPAD array 306. In some embodiments, input aperture 402 and output aperture 404 each has a square shape.

An area of input aperture 402 may be referred to as A1, and an area of output aperture 404 may be referred to as A2. As shown in FIGS. 4A and 4B, in some embodiments, input aperture 402 and output aperture 404 may each have a rectangular shape such as a square shape, and the lateral dimensions may respectively be a1 and a2. That is, A1 is equal to $a1^2$, and A2 is equal to $a2^2$. In some embodiments, A1 is greater than A2. In some embodiments, a1 is greater than a2. In some embodiments, as shown in FIGS. 4A and 4B, light concentrator 410 has a shape of an inverse pyramidal shape. Accordingly, geometric centers of input aperture 402 and output aperture 404 may align in the z-direction. In some embodiments, each light concentrator 410 has the same lateral dimensions a1 and a2.

Side surface 406 of light concentrator 410 may be in contact with input aperture 402 and output aperture 404. In some embodiments, side surface 406 surrounds input aperture 402 and output aperture 404. As shown in FIGS. 4A and 4B, in some embodiments, light concentrator 410 has an inverse pyramidal shape, and side surface 406 has four sidewalls, each extending in a straight line and in contact with respective sides of input aperture 402 and output aperture 404. In some embodiments, a depth T1 of light concentrator 410, between input aperture 402 and output aperture 404 in the z-direction, may be in a range of between about 100 μm and 1500 μm. In some embodiments, the lateral dimension of light concentrator 410 decreases as depth T1 increases in the z-direction.

Side surface 406 may be configured for light reflection. Side surface 406 may laterally enclose the space between the top surface and the bottom surface of light concentrator 410. Side surface 406 may include a base material that forms the shape of light concentrator 410, e.g., an inverse pyramidal shape, of light concentrator 410, and a reflective layer partially or fully covering the base material. The base material may include a suitable material that has desirable rigidity and can be patterned in a fabrication process, e.g., a wafer-level fabrication process. For example, the base material may include silicon, germanium, glass, sapphire, etc. In some embodiments, the base material includes single-crystalline silicon. The reflective layer may include a suitable reflective material that can be coated onto the base material in a fabrication process to provide desirably high reflectivity. For example, the reflective material may include metal such as aluminum, copper, gold, and/or silver.

An acute angle θ1, of light concentrator 410, between side surface 406 and the x-y plane, may be in a desirable range to maximize the amount of light to be collected and minimize the non-photo-sensitive area between adjacent SPADs 316. In some embodiments, acute angle θ1 and depth T1 may together determine the amount of light to be collected by light concentrator 410. In some embodiments, acute angle θ1 may be less than or equal to 75° and greater than or equal to 45°. In some embodiments, the formation and value of acute angle θ1 may be partially or fully dependent on the base material and the fabrication. For example, the base material may have a crystalline structure with an <100> orientation, and acute angle θ1 may be equal to the angle between the <111> plane and the x-y plane. In some embodiments, the base material may include single-crystalline silicon, and acute angle θ1 may be equal to about 54.7°, which is the angle between the <111> plane of single-crystalline silicon and the x-y plane. A length L1 of side surface 406 in a vertical plane, e.g., x-z plane and/or y-z plane, may be equal to T1/Sin θ1. In some embodiments, length L1 may be in a range of about 100 μm and 1500 μm. In some embodiments, length L1 is greater than depth T1.

SPAD 316 may be positioned behind/under output aperture 404 in the z-direction. SPAD 316 may receive and absorb reflected light beam 308R from side surface 406. In some embodiments, light concentrator 410 is coupled to SPAD 316, e.g., by bonding, such that the top surface of SPAD 316 is coplanar with the bottom surface of light concentrator 410. The photo-sensitive area of SPAD 316 may have any suitable shape in the x-y plane and can be fully covered by output aperture 404. As an example, a circular photo-sensitive area of SPAD 316 is shown in the figures. A gain C (e.g., gain number) of light concentrator 410 can be defined as C=A1/B, where A1 is the area of input aperture 402 and B is the area of the photo-sensitive area of the respective SPAD 316. Gain C represents the ratio between the amount of light incident on SPAD 316 with light concentrator 410 to the amount of light incident on SPAD without light concentrator 410. As shown in FIGS. 4A and 4B, because A1 is greater than A2, which is equal to or greater than B, gain C of light concentrator 410 is greater than 1. That is, the amount of light incident on SPAD 316 with light concentrator 410 is greater than that without light concentrator 410. The light collection efficiency of SPAD 316 can be improved. Gain C may be in a range of about 1.5 to about 2.5. For example, Gain C may be 1.5, 1.7, 1.8, 2, 2.2, 2.4, 2.5, etc. In some embodiments, gain C is equal to about 2.

In operation, input aperture 402 may receive light beam 308 from an angle in the acceptable range. Light beam 308 may be incident on and reflected by side surface 406, forming reflected light beam 308R traveling towards output aperture 404. Output aperture 404 may then output reflected light beam 308R towards the photo-active area of SPAD 316. Compared to SPAD 316 without light concentrator 410, SPAD 316 with light concentrator 410 can receive light beam 308 from a wider range of angles, increasing the light collecting efficiency and further light absorption by SPAD 316.

Figures 5A, 5B:
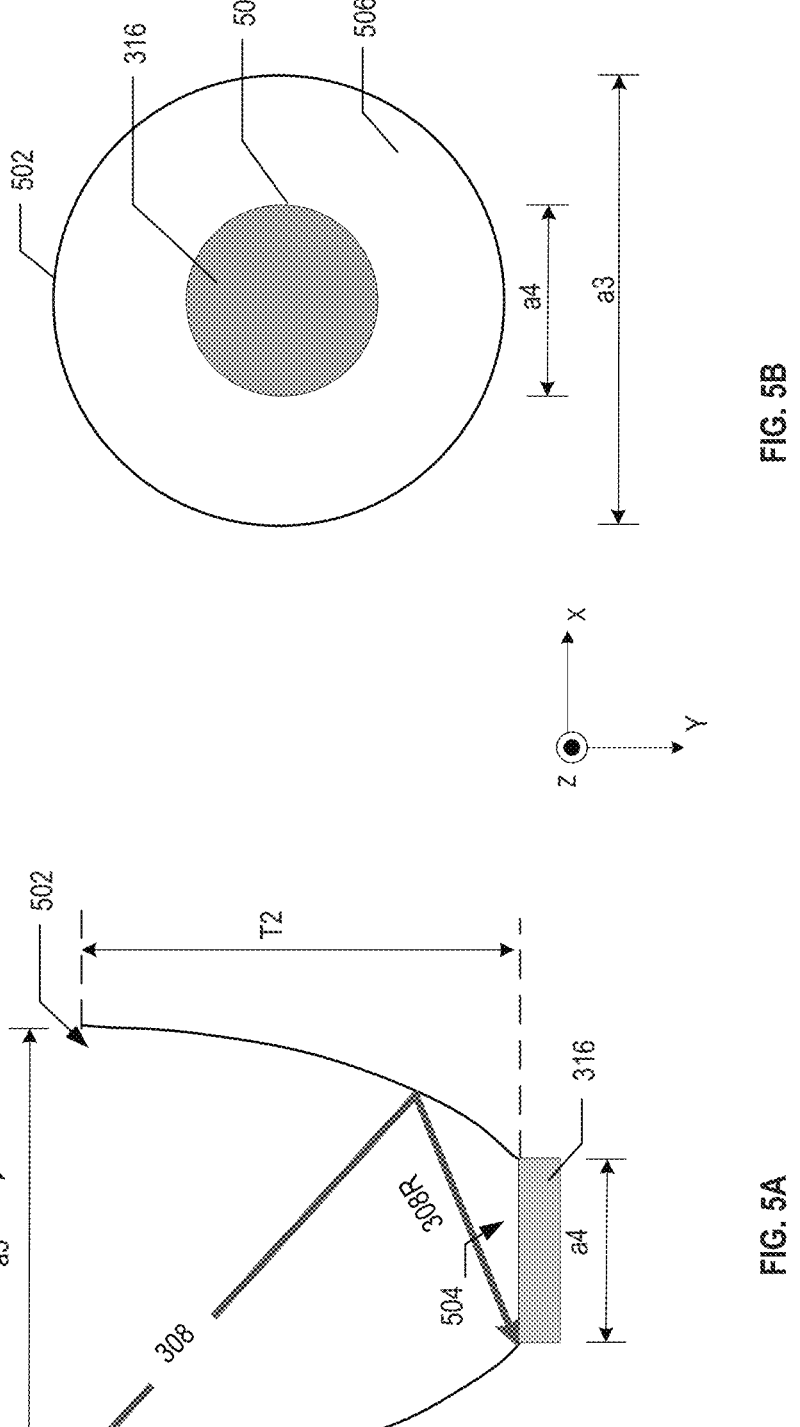
FIG. 5A illustrates a cross-sectional view of another exemplary light concentrator, according to embodiments of the disclosure.
FIG. 5B illustrates a top view of the light concentrator shown in FIG. 5A, according to embodiments of the disclosure.

FIG. 5A illustrates a cross-sectional view of a light concentrator 510 and respective SPAD 316 along a C-C' direction, according to some embodiments. FIG. 5B illustrates an overview of light concentrator 510 and respective SPAD 316, according to some embodiments. Light concentrator 510 may be another example of light concentrator 304 shown in FIG. 3A. For ease of illustration, FIGS. 5A and 5B are described together. As shown in FIGS. 5A and 5B, light concentrator 510 may include an input aperture 502, an output aperture 504, and a side surface 506 in contact with input aperture 502 and output aperture 504. Light concentrator 510 may also be referred to as a compound parabolic light concentrator. Light beam 308 may pass through input aperture 502, be incident on side surface 506, and be reflected towards output aperture 504. SPAD 316 may be positioned behind output aperture 504 to receive a reflected light beam 308R.

Input aperture 502 of light concentrator 510 may be located at a top surface of light concentrator 510. Output aperture 504 of light concentrator 510 may be located at a bottom surface of light concentrator 510. In some embodiments, the top surface and the bottom surface are each in parallel with the x-y plane. As shown in FIG. 5A, along the z-direction, input aperture 502 is above output aperture 504 such that input aperture 502 is further away from SPAD 316 than output aperture 504. Input aperture 502 may be configured to receive light beam 308, and output aperture 504 may be configured to output reflected light beam 308R. Input aperture 502 and output aperture 504 may each have a suitable shape such as a square shape, a circular shape, a rectangular shape, etc. In some embodiments, similar to light concentrator 410, input aperture 502 and output aperture 504 each has a circular shape.

An area of input aperture 502 may be referred to as A3, and an area of output aperture 504 may be referred to as A4. As shown in FIGS. 5A and 5B, in some embodiments, input aperture 502 and output aperture 504 may each have a circular shape, and the lateral dimensions (e.g., diameters) may respectively be a3 and a4. That is, A3 is equal to $\frac{1}{4}(\pi \times a3^2)$, and A4 is equal to $\frac{1}{4}(\pi \times a4^2)$. In some embodiments, A3 is greater than A4. In some embodiments, a3 is greater than a4. In some embodiments, as shown in FIGS. 5A and 5B, geometric centers of input aperture 502 and output aperture 504 may align in the z-direction. In some embodiments, each light concentrator 510 has the same lateral dimensions a3 and a4.

Side surface 506 of light concentrator 510 may be in contact with input aperture 502 and output aperture 504. In some embodiments, side surface 506 surrounds input aperture 502 and output aperture 504. As shown in FIGS. 5A and 5B, in some embodiments, side surface 506 has four sidewalls, each extending in a straight line and in contact with respective sides of input aperture 502 and output aperture 504. In some embodiments, a depth T2 of light concentrator 510, between input aperture 502 and output aperture 504 in the z-direction, may be in a range of between about 100 μm and 1500 μm.

Side surface 506 may be configured for light reflection. Side surface 506 may laterally enclose the space between the top surface and the bottom surface of light concentrator 510. Similar to side surface 406, side surface 506 may include a base material that forms the shape of light concentrator 510, e.g., compound parabolic shape, of light concentrator 510, and a reflective layer partially or fully covering the base material. Similar to light concentrator 510, the base material may include silicon, germanium, glass, sapphire, etc., and the reflective material may include metal such as aluminum, copper, gold, and/or silver.

An acute angle θ2, of light concentrator 510, may be referred to as a half-acceptance angle, which represents the angle through which a light beam can be moved from the normal to the axis of the parabola axis of side surface 506 and still converge at output aperture 504. Acute angle θ2 may be in a desirable range to collect a maximum amount of incident light and minimize light incident on the non-photosensitive area between adjacent SPADs 316. In some embodiments, acute angle θ2 may be less than or equal to 90° and greater than or equal to 50°. Light concentrator 510 may have the same half-acceptance angle over the entire input aperture 502.

Similar to light concentrator 410, SPAD 316 may be positioned behind/under output aperture 504 in the z-direction to receive and absorb reflected light beam 308R from side surface 506. In some embodiments, the top surface of SPAD 316 is coplanar with the bottom surface of light concentrator 510. A gain C of light concentrator 510 can be defined as C=A3/B, where A3 is the area of input aperture 502 and B is the area of the photo-sensitive area of the respective SPAD 316. Similar to light concentrator 410, gain C of light concentrator 510 is greater than 1. Gain C may be in a range of about 1.5 to about 2.5. In some embodiments, gain C is equal to about 2.

In operation, input aperture 502 may receive light beam 308 from an angle in the acceptable range. Light beam 308 may be incident on and reflected by side surface 506, forming reflected light beam 308R traveling towards output aperture 504. Output aperture 504 may then output reflected light beam 308R towards the photo-active area of SPAD 316. Compared to SPAD 316 without light concentrator 510, SPAD 316 with light concentrator 510 can receive light beam 308 from a wider range of angles, increasing the light collecting efficiency and further light absorption by SPAD 316.

It should be noted that, although embodiments of the present disclosure are exemplified in a light concentrating device having an array of light concentrators, coupled with a SPAD array, in various other embodiments, when photosensor 216 includes a single photodetector, e.g., a single SPAD, the light concentrating device may include a single light concentrator coupled to the single SPAD. The single light concentrator may include an input aperture, an output aperture, and a side surface in contact and surrounding the input and output apertures. In some embodiments, the area of the input aperture is greater than the area of the output aperture and a gain of the single light concentrator is greater than 1.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:
1. An optical sensing device for a receiver in an optical sensing system, comprising:

a light concentrator configured to collect a light beam, wherein the light concentrator comprises:

an input aperture configured to collect the light beam;

an output aperture configured to output the light beam; and a side surface in contact with the input aperture and the output aperture, configured to reflect the collected light beam towards the output aperture, wherein a gain number of the light concentrator is in a range between about 1.5 and about 2.5, the gain number being equal to a ratio of an area of the input aperture over an area of the photodetector; and a single photon avalanche diode (SPAD) chip comprising a photodetector, wherein the photodetector is placed behind the light concentrator, wherein the photodetector is configured to receive the light beam collected through the output aperture and convert the light beam to an electrical current, and wherein the light concentrator is bonded to the SPAD chip through eutectic bonding.

2. The optical sensing device of claim 1, wherein:

the input aperture is located at a top surface of the light concentrator;

the output aperture is located at a bottom surface of the light concentrator;

the photodetector is located at the bottom surface of the light concentrator; and the side surface laterally encloses a space between the top surface and the bottom surface.

3. The optical sensing device of claim 2, wherein a depth of the light concentrator is in a range of about 100 μm to about 1500 μm.

4. The optical sensing device of claim 2, wherein:

the side surface extends along a straight line; and an acute angle between the side surface and the bottom surface is between greater than 45° and less than 75°.

5. The optical sensing device of claim 4, wherein the input aperture, the output aperture, and the side surface form an inverse pyramidal shape, the input aperture and the output aperture each having a rectangular shape.

6. The optical sensing device of claim 4, wherein the acute angle is equal to an angle between a <111> plane of a crystalline structure of the light concentrator in Miller indices and the bottom surface and is about 54.7°.

7. The optical sensing device of claim 2, wherein the side surface extends along a parabola.

8. The optical sensing device of claim 2, wherein the side surface of the light concentrator comprises a reflective layer over crystalline silicon having a <100> orientation of Miller indices with respective to the bottom surface.

9. An optical sensing device for a receiver in an optical sensing system, comprising:

an array of light concentrators configured to collect a light beam for an array of photodetectors, each of the light concentrators being over a respective photodetector, wherein each light concentrator comprises:

an input aperture configured to collect the light beam, a side surface surrounding the input aperture, configured to reflect the light beam towards an output aperture, and an output aperture configured to output the light beam, wherein a gain number of each of the light concentrators is in a range between about 1.5 and about 2.5, the gain number being equal to a ratio of an area of the input aperture over an area of the photodetector, and a single photon avalanche diode (SPAD) chip comprising an array of photodetectors, wherein the array of photodetectors are placed behind the array of light concentrators, wherein the photodetectors are each configured to receive the light beam collected through the output aperture and convert the light beam to an electrical current, and wherein the array of light concentrators is bonded to the SPAD chip through eutectic bonding.

10. The optical sensing device of claim 9, wherein, for each of the light concentrators:

the input aperture is located at a top surface of the light concentrator;

the output aperture is located at a bottom surface of the light concentrator;

the photodetector is located at the bottom surface of the light concentrator; and the side surface laterally encloses a space between the top surface and the bottom surface.

11. The optical sensing device of claim 10, wherein a depth of the light concentrator is in a range of about 100 μm to about 1500 μm.

12. The optical sensing device of claim 10, wherein:

the side surface extends along a straight line; and an acute angle between the side surface and the bottom surface is between greater than 45° and less than 75°.

13. The optical sensing device of claim 12, wherein the input aperture, the output aperture, and the side surface form an inverse pyramidal shape, the input aperture and the output aperture each having a rectangular shape.

14. The optical sensing device of claim 12, wherein the acute angle is equal to an angle between a <111> plane of a crystalline structure of the array of light concentrators in Miller indices and the bottom surface and is about 54.7°.

15. The optical sensing device of claim 10, wherein the side surface of the light concentrator comprises a reflective layer over crystalline silicon having a <100> orientation with respective to the bottom surface.

16. An optical sensing system, comprising:

a transmitter configured to transmit a light beam towards an object; and a receiver configured to receive the light beam returned from the object and convert the light beam to an electric current, wherein the receiver comprises:

an array of light concentrators configured to collect a light beam for an array of photodetectors, each of the light concentrators being over a respective photodetector, wherein each light concentrator comprises:

an input aperture configured to collect the light beam, a side surface surrounding the input aperture, configured to reflect the light beam towards an output aperture, and an output aperture configured to output the light beam, wherein a gain number of each of the light concentrators is in a range between about 1.5 and about 2.5, the gain number being equal to a ratio of an area of the input aperture over an area of the photodetector, and a single photon avalanche diode (SPAD) chip comprising an array of photodetectors, wherein the array of photodetectors are placed behind the light concentrators, wherein the photodetectors are each configured to receive the light beam collected through the output aperture, and wherein the array of light concentrators is bonded to the SPAD chip through eutectic bonding.

17. The optical sensing system of claim 16, wherein, for each of the light concentrators:

the input aperture is located at a top surface of the light concentrator;

the output aperture is located at a bottom surface of the light concentrator; the photodetector is located at the bottom surface of the light concentrator;

the side surface laterally encloses a space between the top surface and the bottom surface; the side surface extends along a straight line; and an acute angle between the side surface and the bottom surface is between greater than 45° and less than 75°.

\* \* \* \* \*